March 28, 1961 M. D. BODLE 2,977,270
PROCESS FOR MAKING WEBBING
Original Filed April 21, 1958
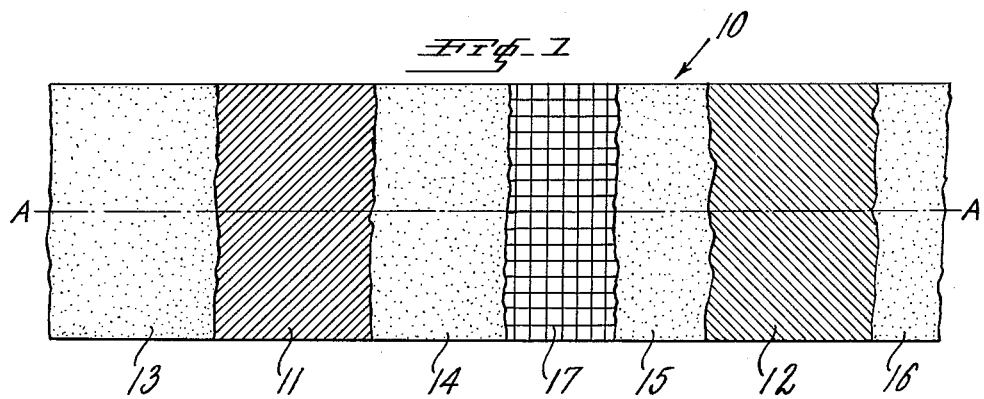
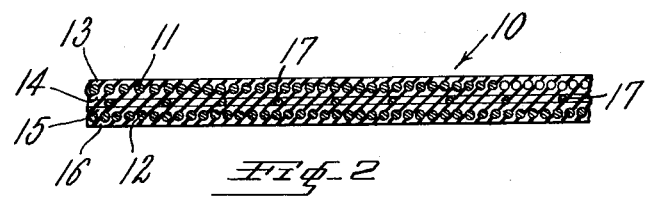
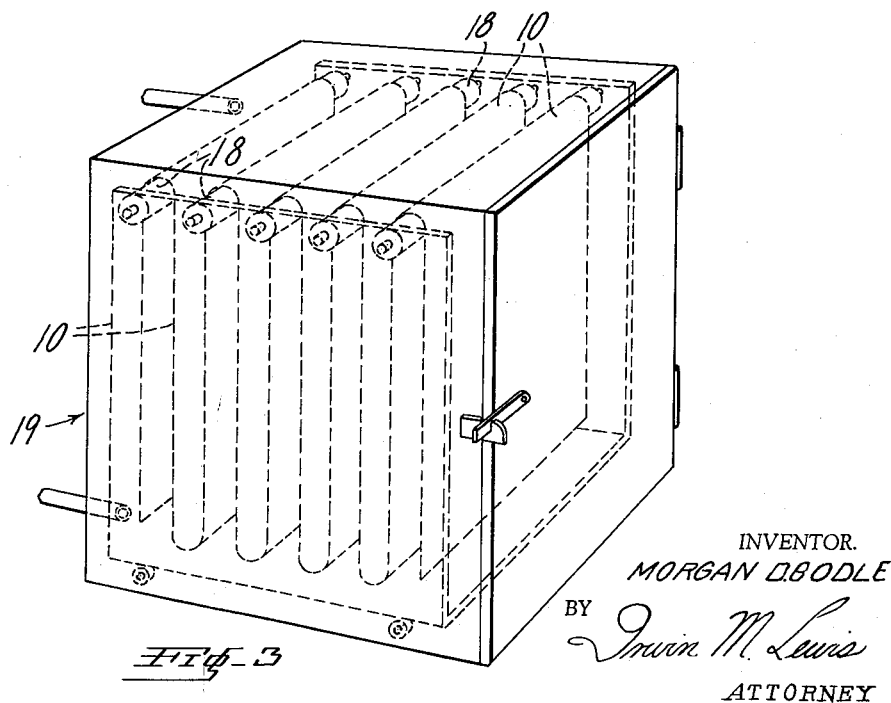
INVENTOR.
MORGAN D. BODLE
BY
Irwin M. Lewis
ATTORNEY

United States Patent Office 2,977,270
Patented Mar. 28, 1961

2,977,270

PROCESS FOR MAKING WEBBING

Morgan D. Bodle, Mishawaka, Ind., assignor to United States Rubber Company, New York, N.Y., a corporation of New Jersey Continuation of application Ser. No. 729,635, Apr. 21, 1958. This application June 13, 1960, Ser. No. 35,840
8 Claims. (Cl. 154—93)

This application is a continuation of my copending prior application, Serial Number 729,635, filed April 21, 1958, now abandoned.

This invention relates to webbing for use in automotive and furniture seating. More particularly the invention relates to stretchable, elastic webbing of the type formed from rubber covered bias cut fabric.

Webbing of this general type is described in U.S. Patent No. 2,251,318. The bias cut fabric permits stretching of the webbing while the rubber covering provides the desired elasticity.

The primary object of the invention is to provide a method by which webbing having improved surface appearance and physical properties may be manufactured in sufficiently long lengths to be commercially feasible. To this end, the webbing is drape cured without the use of a supporting liner so that the air, steam, or other heating medium may contact both sides of the webbing with equal facility to thereby insure uniform curing of both sides and to insure that the surface of the webbing is not marred by a liner in contact therewith during curing. In accordance with the present invention, curing of long lengths of the webbing in such a manner without a supporting liner is made possible by temporarily strengthening the webbing internally against stretching so that the webbing will not distort due to the weight of the material, and/or the bias construction, and/or the heat of the curing or vulcanization. This temporary strengthening is provided by a layer of relatively unstretchable square woven, straight laid fabric, of less strength and lower elongation at break than the bias cut fabric, interposed between the two layers of the bias cut fabric. Being straight laid this fabric prevents stretching or sagging of the webbing during curing. The bias cut fabric being bias laid provides very little resistance to stretching or sagging. On the other hand the straight laid fabric being weaker than the bias laid fabric breaks upon initial use thereof as seat webbing so that the webbing thereafter functions essentially as if the straight laid fabric had not been incorporated in the webbing. If desired it may be broken by elongation during finishing operations subsequent to vulcanization of the material.

Other objects and advantages of the present invention will become apparent from the following description when read in conjunction with accompanying drawings wherein, Fig. 1 is a plan view of webbing made in accordance with the present invention with parts thereof broken away to show the various laminations of the webbing;

Fig. 2 is a sectional view of the webbing of Fig. 1, and

Fig. 3 is a schematic view showing the drape curing of the webbing.

Referring to the drawings and in particular to Fig. 1, webbing formed in accordance with the invention is generally indicated by the reference numeral 10. The bias cut, bias laid fabric layers are identified by the reference numerals 11 and 12. While the fabric layers 11 and 12 are shown as of a weftless construction as used in the manufacture of tires, it will be appreciated that a bias cut, bias laid woven fabric incorporating a weft thread can be used.

The fabric layers 11 and 12 are preferably bias laid at an angle of approximately 45° to the longitudinal axis A—A of the webbing so that the resulting included angle between the threads of the fabric of the layer 11 and the layer 12 when the webbing is unstretched is approximately 90°. It will be appreciated that this orientation of the threads of the fabrics 11 and 12 permits the webbing to stretch longitudinally upon application of a stretching force thereto.

The bias cut fabric layers 11 and 12 are covered on each side with layers of rubber 13, 14 and 15, 16, respectively. These layers of rubber are conveniently applied to the fabrics in the unvulcanized state by a conventional calendering process. If desired, the fabric layers may be impregnated with rubber cement prior to the calendering of the rubber layers to increase the adhesion of the rubber layers to the fabric. After each fabric layer 11 and 12 has been coated or covered on each side with unvulcanized rubber, the fabric so coated or covered is laminated together with a layer 17 of square cut, square woven fabric interposed therebetween.

If desired the fabric layer 17 may be friction coated with unvulcanized rubber or impregnated with rubber cement to increase the adhesion thereof with the rubber coatings 14 and 15 of the bias cut fabric layers 11 and 12. Satisfactory results have, however, been obtained using the fabric 17 untreated. The layers or laminations are conveniently laminated by running the superimposed layers through conventional squeeze or laminating rollers.

The fabric 17 is of less strength and elongation at break than the bias cut fabric layers 11 and 12 and may be relatively lightweight and flimsy. A cheesecloth having a thread count of 8 ends and 8 picks and weighing approximately ½ oz. per square yard is satisfactory for the purpose when a tire cord fabric having a thread count of 24 ends and 2.5 picks and weighing 11.5 oz. per square yard is used for the layers 11 and 12.

As shown in Fig. 1, the fabric 17 is straight laid so that the one set of the threads thereof extends longitudinally of the webbing. These longitudinally extending threads prevent the laminated webbing from sagging and distorting during the subsequent drape curing.

As shown in Fig. 3, the drape curing is performed by suspending or draping the uncured laminated webbing between space supports 18 in a chamber 19, commonly referred to as an autoclave, into which the heating medium such as steam, hot air or the like is introduced under pressure thereby pressurizing said chamber. While the laminated webbing is so suspended or draped, the air, steam or other vulcanizing medium may contact both sides of the laminated webbing with equal facility to thereby insure uniform curing of both sides. Good results are obtained using a mixture of air and ammonia for the curing medium. Because of the presence of the straight laid fabric 17, relatively long lengths of the webbing may be cured without intermediate external support. The webbing is left in the curing chamber until the rubber of the webbing becomes vulcanized.

While a preferred form of the invention has been shown and described it will be appreciated that this is for the purpose of illustration and that modifications and changes may be made therein without departing from the spirit and scope of the invention. For example while two layers of bias cut fabric have been shown and described, it will be appreciated that a greater number of layers can be used depending on the end use of the product. The term "rubber" is used herein in its generic sense to mean natural rubber, synthetic rubber, and blends thereof. The term "square woven" is used herein in the sense that it is used in the rubber goods industry to designate any woven fabric wherein the ends and picks are at right angles to each other, as opposed to a knitted or circularly woven fabric.

Having thus described my invention, what I claim and desire to protect by Letters Patent is:

1. The method of forming webbing comprising laminating two layers of bias cut unvulcanized rubber covered fabric with a layer of relatively unstretchable straight cut, square woven fabric of less strength and elongation at break than said bias cut fabric, suspending lengths of the laminate so formed between spaced supports in a curing chamber, and while said laminate is so suspended subjecting said laminate to heat and pressure for a sufficient time to vulcanize said rubber.

2. In the process of forming webbing which comprises laminating at least two layers of bias cut, unvulcanized rubber covered fabric, suspending lengths of the laminate so formed, drape fashion, between spaced supports and, while said laminate is so suspended, subjecting said laminate to heat and pressure for a sufficient time to vulcanize said rubber, the improvement consisting in the inclusion in said laminate between said two layers, at the time of its formation and as an integral part thereof, of a layer of relatively unstretchable straight laid, square woven fabric of less strength and elongation at break than the bias cut fabric, said square woven fabric being of sufficient strength to support the dead weight of the webbing during vulcanizing without permitting appreciable distortion, including stretching, of the webbing due to the bias construction and the heat of vulcanization, but being sufficiently weak so as to be broken relatively easily after vulcanization without impeding the desired end use stretching and elasticity of the finished webbing.

3. The process of claim 2 wherein the straight laid, square woven fabric is broken by mechanically stressing the webbing as a step in the manufacturing process performed subsequent to vulcanization.

4. In the process of forming webbing which comprises laminating at least two layers of bias cut, unvulcanized rubber covered fabric, suspending lengths of the laminate so formed, drape fashion, between spaced supports and, while said laminate is so suspended, subjecting said laminate to heat and pressure for a sufficient time to vulcanize said rubber, the improvement consisting in temporarily strengthening the webbing internally against stretching so that the webbing will not be distorted during the vulcanization step due to the weight of the material, the bias construction, and the heat of vulcanization, such temporary strengthening being effected by interposing a layer of relatively unstretchable square woven, straight laid fabric, of less strength and lower elongation at break than said bias cut fabric, between said two layers of bias cut fabric, said interposed layer being an integral part of said webbing during said vulcanization step.

5. The method of forming webbing comprising laminating two layers of bias cut, unvulcanized, rubber covered fabric with a layer of relatively unstretchable, straight cut, woven fabric of less strength and elongation at break than said bias cut fabric, suspending lengths of the laminate so formed between spaced supports in a curing chamber and, while said laminate is so suspended, subjecting said laminate to heat and pressure for a sufficient time to vulcanize said rubber.

6. In the process of forming webbing which comprises laminating at least two layers of bias cut, unvulcanized rubber covered fabric, suspending lengths of the laminate so formed, drape fashion, between spaced supports and, while said laminate is so suspended, subjecting said laminate to heat and pressure for a sufficient time to vulcanize said rubber, the improvement consisting in the inclusion in said laminate, between said two layers, at the time of its formation and as an integral part thereof, of a layer of relatively unstretchable, straight laid, woven fabric of less strength and elongation at break than said bias cut fabric, said straight laid fabric being of sufficient strength to support the dead weight of the webbing during vulcanizing without permitting appreciable distortion, including stretching, of the webbing due to the bias construction and the heat of vulcanization, but being sufficiently weak so as to be broken relatively easily after vulcanization without impeding the desired end-use stretching and elasticity of the finished webbing.

7. The process of claim 6 wherein said straight laid fabric is broken by mechanically stressing the webbing as a step in the manufacturing process performed subsequent to vulcanization.

8. In the process of forming webbing which comprises laminating at least two layers of bias cut, unvulcanized, rubber covered fabric, suspending lengths of the laminate so formed, drape fashion, between spaced supports and, while said laminate is so suspended, subjecting said laminate to heat and pressure for a sufficient time to vulcanize said rubber, the improvement consisting in temporarily strengthening the webbing internally against stretching so that the webbing will not be distorted during the vulcanization step due to the weight of the material, the bias construction and the heat of vulcanization, such temporary strengthening being effected by interposing a layer of relatively unstretchable, straight laid, woven fabric of less strength and lower elongation at break than said bias cut fabric between said two layers of bias cut fabric, said interposed layer being an integral part of said webbing during said vulcanization step.

References Cited in the file of this patent

UNITED STATES PATENTS

| Number | Name | Date |
|---|---|---|
| 1,515,702 | Reybold | Nov. 18, 1924 |
| 1,872,846 | Thiele | Aug. 23, 1932 |
| 1,916,640 | Rubin et al. | July 4, 1933 |
| 2,331,323 | Jahant | Oct. 12, 1943 |
| 2,345,541 | Scholze | Mar. 28, 1944 |
| 2,430,931 | Hershberger | Nov. 18, 1947 |
| 2,499,724 | Compton | Mar. 7, 1950 |
| 2,512,128 | Albright | June 20, 1950 |
| 2,689,196 | Daniels | Sept. 14, 1954 |